United States Patent
Shimizu

(10) Patent No.: US 7,714,938 B2
(45) Date of Patent: May 11, 2010

(54) ENHANCEMENT OF VIDEO IMAGES BY BOOST OF SECONDARY COLORS

(75) Inventor: Jeffrey Arthur Shimizu, Cortlandt Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 669 days.

(21) Appl. No.: 10/586,181

(22) PCT Filed: Jan. 27, 2005

(86) PCT No.: PCT/IB2005/050361

§ 371 (c)(1),
(2), (4) Date: Jul. 17, 2006

(87) PCT Pub. No.: WO2005/074301

PCT Pub. Date: Aug. 11, 2005

(65) Prior Publication Data

US 2007/0120866 A1    May 31, 2007

Related U.S. Application Data

(60) Provisional application No. 60/540,710, filed on Jan. 30, 2004.

(51) Int. Cl.
*H04N 9/68*    (2006.01)

(52) U.S. Cl. ..................... 348/645; 348/649
(58) Field of Classification Search ......... 348/645–654; 345/594, 589
See application file for complete search history.

(56) References Cited

U.S. PATENT DOCUMENTS

| 5,282,021 | A | * | 1/1994 | Bachmann et al. ........... 348/649 |
| 5,412,433 | A | * | 5/1995 | Holland et al. .............. 348/650 |
| 6,337,692 | B1 | * | 1/2002 | Rai et al. ..................... 345/594 |
| 6,466,274 | B1 | | 10/2002 | White |
| 6,507,667 | B1 | | 1/2003 | Hsieh et al. |

FOREIGN PATENT DOCUMENTS

| EP | 0393812 | | 10/1990 |
| EP | 0448250 | A | 9/1991 |
| WO | WO 01/78368 | A | 10/2001 |
| WO | WO 02/09955 | | 12/2002 |

* cited by examiner

*Primary Examiner*—Michael Lee

(57) ABSTRACT

A method for enhancing a video image by processing a video signal includes inputting a video signal and boosting color saturation or lightness of the video signal as a its hue gets closer to a secondary color, and/or shifting the hue of the video signal toward one or more secondary colors. This produces an enhancement of secondary color representation, for example by boosting cyan and yellow colors while not boosting primary colors.

14 Claims, 2 Drawing Sheets

ENHANCEMENT OF VIDEO IMAGES BY BOOST OF SECONDARY COLORS

CROSS REFERENCE TO RELATED APPLICATION

Figure 1:
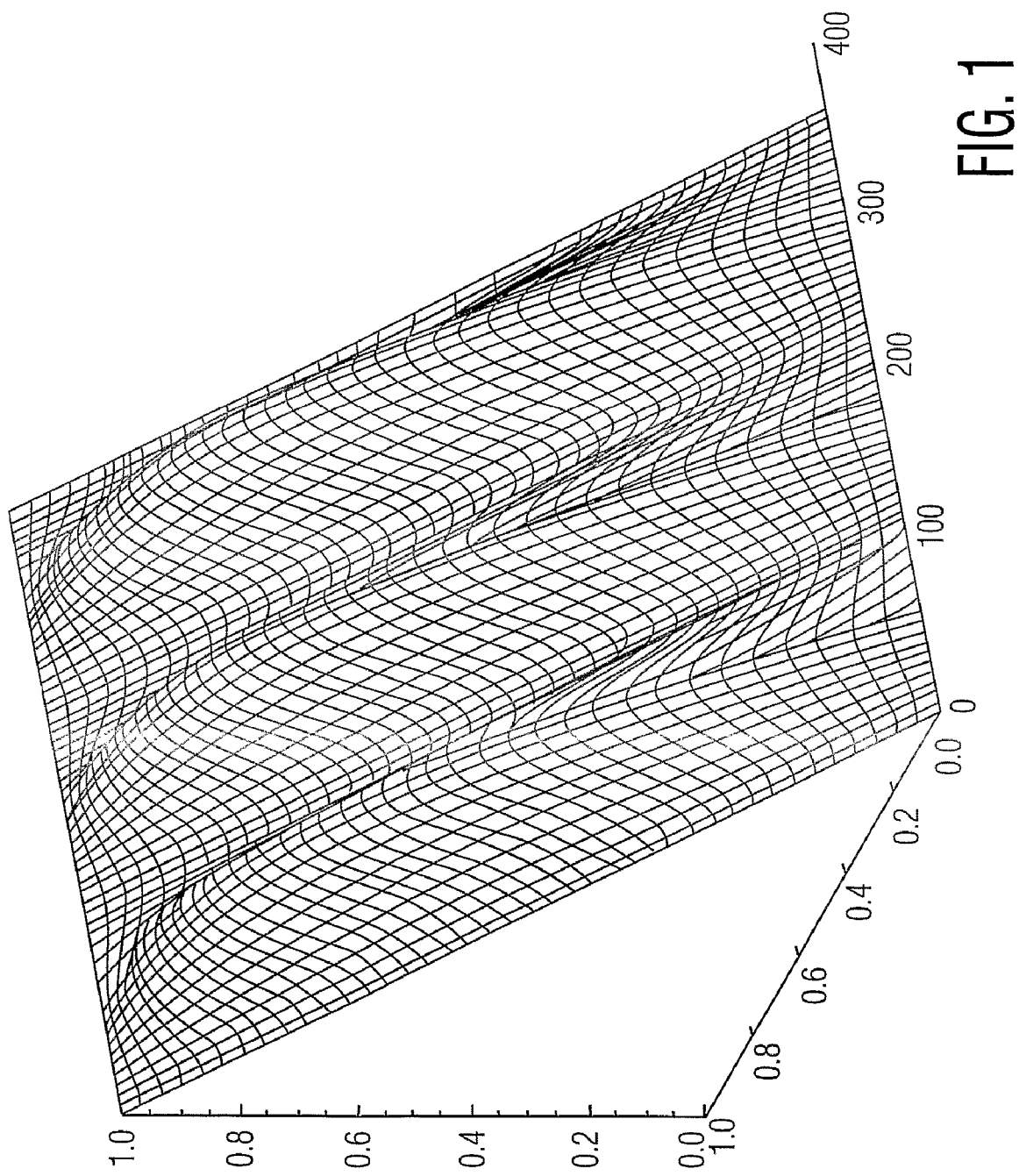

This application claims the benefit of U.S. provisional application Ser. No. 60/540,710 filed Jan. 30, 2004, which is incorporated herein in whole by reference.

This invention relates to perceived image quality, and more particularly to improving perceived image color quality in television or other video displays.

Nearly all displays show color through the mixing of three primary colors, usually red, green, and blue. However, the gamut of a three-color display does not cover the full range of naturally occurring colors. Nor does it cover the gamut of colors achieved through printing on paper with dyes and inks. For this reason a number of proposals, for example, WTO patent disclosures WO0195544, WO0250763, and references cited therein, exist for displays and display systems that make use of more than three colors in an additive electronic display. This approach will effectively increase the gamut of displayable colors. However the penalty is a significant increase in the complexity of the display and increased complexity in the required data handling.

It has been found that a multi-primary (i.e. more than three) display does enhance the perceived quality of video imagery, even when standard sources are used. Standard video sources generally do not use sensors or video data paths that account for multiple primaries. Further if the signal passes through RGB (red, green, blue) data processing, any information for colors outside the three-color gamut is lost. Hence, any enhancement to image quality of a wider color gamut comes from the distortion or stretching of video data, and not from a more accurate representation of color data.

It is also known that an increase in overall color saturation improves the perception of video images. Thus, studio or post-production of video material typically makes use of color saturation boost. Saturation control is also included at the display level. The user may set the saturation level of the display and the default position is chosen by the maker to give the most pleasing image to the average viewer.

It would be desirable to enhance the video image through processing of the video signal, without requiring a hardware change of the basic display. It would also be desirable to achieve much of the subjective advantage of a multi-primary display, without the large complexity of adding additional primaries. To address one or more of these problems, we propose the use of signal processing boost the image when the color falls at or near the secondary colors of cyan, magenta, and yellow. This is more effective than an overall saturation boost that enhances color everywhere.

To address one or more of these problems, in one aspect of the invention, a method for enhancing a video image includes inputting a video signal and shifting hue of the signal to be closer to a secondary color.

In another aspect of the invention, a method for enhancing a video image includes inputting video signals representative of the image and increasing color saturation of the video signals as a function of proximity of their hue to a secondary color.

In another aspect of the invention, a method for enhancing a video image includes inputting video signals representative of the image and increasing lightness of the video signals as a function of proximity of their hue to a secondary color.

Figure 2:
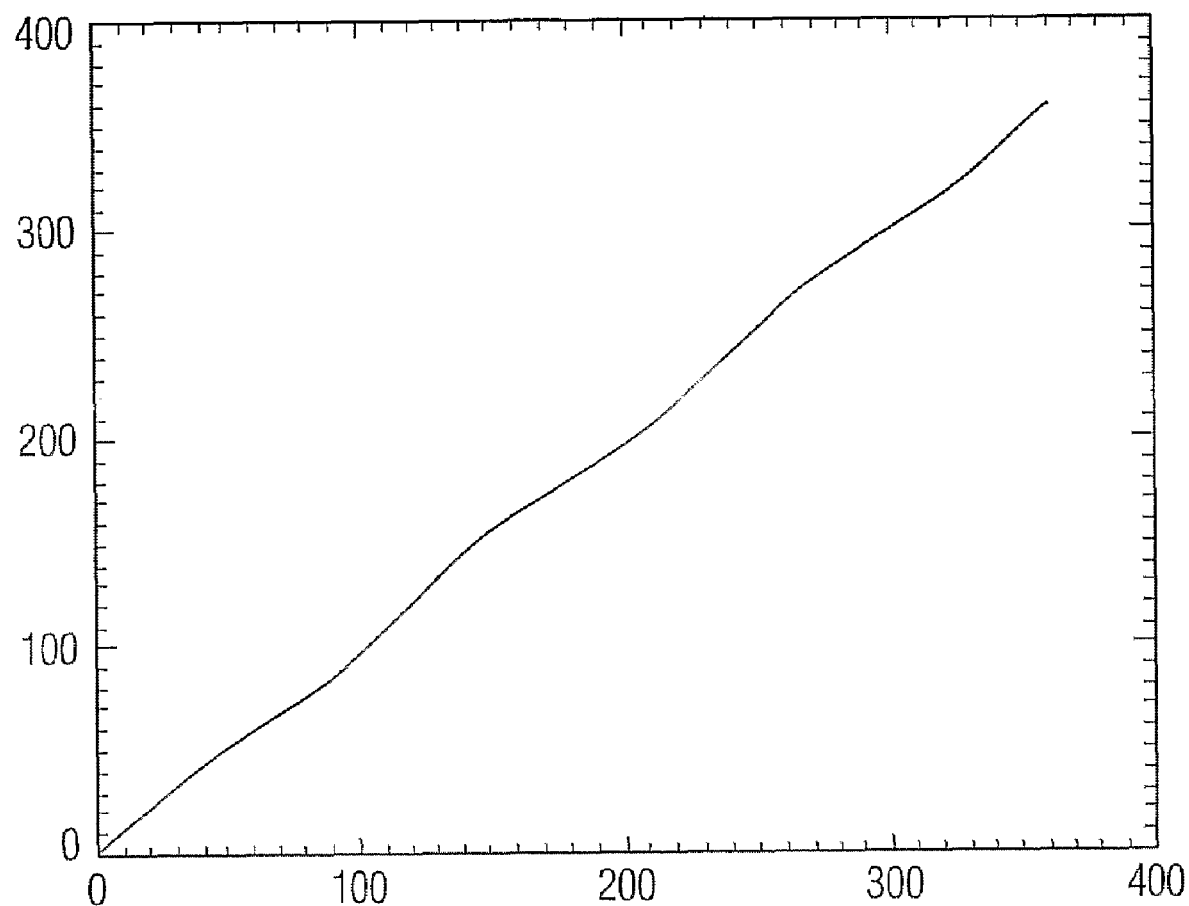

The following drawing figures are illustrative of these effects:

FIG. 1 is a plot of the boosted saturation signal as a function of the input hue and saturation values according to an example embodiment of the invention; and FIG. 2 is a plot of the hue enhancement function in an expansion of the secondary color regions in an example embodiment of the invention.

From experiments with a multi-primary display, the most notable enhancements come from the ability to display saturated and strong cyan and yellow colors. Based on these subjective observations, it is desirable to boost the image when data calls for a color in these regions. Further, a boost in the magenta area may also be beneficial. Thus one method of implementing the invention is to examine the incoming signal for the desired color and to enhance the secondary color regions of cyan, magenta, and yellow. However, if the color falls near the primary colors of red, green, and blue, no enhancement is applied.

For the purposes of this description the image will be examined with regard to hue, lightness, and saturation (HLS). The signal may be converted from RGB (red, green, blue) to HLS. Alternatively the signal may be converted from other common formats, such as YCC, YUV to an equivalent HLS space. In the discussion below the lightness and saturation scales are normalized between 0 and 1, and the hue signal is between 0 and 360, where 0 is red, 120 is green, and 240 is blue.

One method of enhancing the secondary colors of the image is to process the video signal so that when the hue signal falls near a secondary color (as opposed to a primary color), the saturation of the color is increased. Conversely when the hue signal is near a primary color there is no change applied to the data. The resultant saturation signal is a function of the incoming saturation and hue. For example, $$sat' = sat + 0.3 * \sin^2(3/2 * hue)$$

where the sine function is evaluated in degrees. The saturation function is shown below in FIG. 1. A flat plane would represent no change in signal.

Another method of enhancing the secondary colors is to emphasize the secondary colors by imparting a boost in lightness (brightness, luminance) as hue approaches one or more secondary colors. For example, $$lit' = lit + 0.08 * \sin^2(3/2 * hue)$$

The enhancement to lightness is not as strong as the boost to the saturation signal.

Another method of enhancing the secondary colors is to actually shift the hue values toward one or more secondary colors. The aim is to bring colors near the secondary colors, closer to the pure secondary color. For example, $$hue' = hue + 5 * \sin(3 * hue).$$

A plot of this hue enhancement function is shown in FIG. 2. The functions given above are examples. The actual boosts would be determined by a greater examination of the perceived impact on the picture. Coefficients would be tuned by perception studies. The functions can be changed as long as the aim of boost near the secondary color regions is maintained. Functions more compatible with fixed point processing of video data may likely be substituted.

The algorithm should create little change where flesh tones are shown. The algorithm may also be changed to reduce the change in the red/orange regions. Thus the width and magnitude of the boost functions could be tailored differently in the three areas of cyan, magenta, and yellow.

Any one, or a combination of more than one of these methods may be used. They may be applied for enhancing only one, or more secondary colors. The effect may be made greater for one or more particular secondary colors by choice of weighting factors.

Other embodiments, variations of embodiments, and equivalents, as well as other aspects, objects, and advantages of the invention, will be apparent to those skilled in the art and can be obtained from a study of the drawings, the disclosure, and the appended claims.

The invention claimed is:

1. A method for enhancing a video image, comprising acts of:
inputting video signals representative of the image; and
increasing, using a video signal processor, color saturation of the video signals as a function of (i) color saturation and (ii) proximity of hue of the video signals to a secondary color, wherein the closer the video signal is in hue to a secondary color, the more the video signal color saturation is increased, and wherein the closer the video signal is in hue to primary colors of red, green, and blue, then no enhancement is applied.

2. The method of claim 1, wherein the color saturation of cyan and yellow colors in the input video signal is increased while the color saturation of primary colors in the input video signal is not increased.

3. The method of claim 1, wherein the color saturation of magenta color in the input video signal is increased.

4. A method for enhancing a video image, comprising acts of:
inputting video signals representative of the image; and
increasing, using a video signal processor, lightness of the video signals as a function of (i) lightness and (ii) proximity of hue of the video signals to a secondary color, wherein the closer the video signal is in hue to a secondary color, the more the lightness of the video signal is increased, and wherein the closer the video signal is in hue to primary colors of red, green, and blue, then no enhancement is applied.

5. The method of claim 4, wherein the lightness of cyan and yellow colors in the input video signal is increased while the lightness of primary colors of the input video signal is not increased.

6. The method of claim 5, wherein the lightness of magenta color in the input video signal is increased.

7. A method for enhancing a video image, comprising:
inputting video signals representative of the image; and
shifting, using a video signal processor, hue of the video signals as a function of proximity of the hue of the video signals to a secondary color, wherein the closer the video signal is in hue to a secondary color, the more the video signal hue is increased.

8. A method for enhancing a video image, comprising acts of:
inputting video signals representative of the image; and
increasing, using a video signal processor, color saturation of the video signals as a function of color saturation and proximity of hue of the video signals to a secondary color, wherein the closer the video signal is in hue to a secondary color, the more the video signal color saturation is increased, wherein the color saturation in the input video signal is increased based on the function sat'=sat+0.3*$\sin^2$(3/2*hue), wherein sat' is an adjusted saturation and sat is the input video signal saturation.

9. A method for enhancing a video image, comprising acts of:
inputting video signals representative of the image; and
increasing, using a video signal processor, lightness of the video signals as a function of lightness and proximity of hue of the video signals to a secondary color, wherein the closer the video signal is in hue to a secondary color, the more the lightness of the video signal is increased, wherein the lightness in the input video signal is increased based on the function lit'=lit+0.08*$\sin^2$(3/2*hue), wherein lit' is an adjusted lightness and lit is the input video signal lightness.

10. The method of claim 7, wherein the hue in the input video signal is increased based on the function hue'=hue+5*sin(3*hue), wherein hue' is an adjusted hue and hue is the input video signal hue.

11. The method of claim 8, wherein the color saturation of cyan and yellow colors in the input video signal is increased while the color saturation of primary colors in the input video signal is not increased.

12. The method of claim 8, wherein the color saturation of magenta color in the input video signal is increased.

13. The method of claim 9, wherein the lightness of cyan and yellow colors in the input video signal is increased while the lightness of primary colors of the input video signal is not increased.

14. The method of claim 9, wherein the lightness of magenta color in the input video signal is increased.

* * * * *